United States Patent
Ding et al.

(10) Patent No.: US 11,168,023 B2
(45) Date of Patent: *Nov. 9, 2021

(54) IG WINDOW UNIT HAVING TRIPLE SILVER COATING AND DIELECTRIC COATING ON OPPOSITE SIDES OF GLASS SUBSTRATE

(71) Applicant: GUARDIAN GLASS, LLC, Auburn Hills, MI (US)

(72) Inventors: Guowen Ding, San Jose, CA (US); Willem Den Boer, Brighton, MI (US); Yiwei Lu, Ann Arbor, MI (US); Cesar Clavero, San Jose, CA (US); Daniel Schweigert, San Jose, CA (US); Sang Lee, San Jose, CA (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,546

(22) Filed: Apr. 20, 2020

(65) Prior Publication Data
US 2020/0290923 A1    Sep. 17, 2020

Related U.S. Application Data

(63) Continuation of application No. 15/917,909, filed on Mar. 12, 2018, now Pat. No. 10,647,611.
(Continued)

(51) Int. Cl.
*E06B 3/67* (2006.01)
*C03C 17/36* (2006.01)
(Continued)

(52) U.S. Cl.
CPC .......... *C03C 17/3639* (2013.01); *C03C 17/36* (2013.01); *C03C 17/3602* (2013.01);
(Continued)

(58) Field of Classification Search
CPC ................. E06B 3/6612; E06B 3/6715; E06B 2009/2417; E06B 9/24; Y02B 80/22;
(Continued)

(56) References Cited

U.S. PATENT DOCUMENTS 9,771,301 B2 * 9/2017 Blacker ............... C03C 17/3613
10,647,611 B2 * 5/2020 Ding ..................... C03C 17/366
(Continued)

FOREIGN PATENT DOCUMENTS

CN    1867522 A    11/2006
CN    101321707 A    12/2008
(Continued)

OTHER PUBLICATIONS

U.S. Appl. No. 15/917,909, filed Mar. 12, 2018; Ding et al.
U.S. Appl. No. 62/469,556, filed Mar. 10, 2017; Ding et al.

*Primary Examiner* — Donald J Loney

(57) ABSTRACT

An insulating glass (IG) window unit including first and second glass substrates that are spaced apart from each other. At least one of the glass substrate has a triple silver low-emissivity (low-E) coating on one major side thereof, and a dielectric coating for improving angular stability on the other major side thereof.

9 Claims, 4 Drawing Sheets

Related U.S. Application Data

(60) Provisional application No. 62/469,556, filed on Mar. 10, 2017.

(51) Int. Cl.
*E06B 9/24* (2006.01)
*C03C 17/23* (2006.01)
*B60J 1/00* (2006.01)
*B60J 1/02* (2006.01)

(52) U.S. Cl.
CPC ........ *C03C 17/366* (2013.01); *C03C 17/3613* (2013.01); *C03C 17/3626* (2013.01); *C03C 17/3636* (2013.01); *C03C 17/3642* (2013.01); *C03C 17/3644* (2013.01); *C03C 17/3681* (2013.01); *E06B 3/6715* (2013.01); *E06B 9/24* (2013.01); *B60J 1/001* (2013.01); *B60J 1/02* (2013.01); *C03C 17/23* (2013.01); *C03C 2217/211* (2013.01); *C03C 2217/212* (2013.01); *C03C 2217/213* (2013.01); *C03C 2217/216* (2013.01); *C03C 2217/23* (2013.01); *C03C 2217/256* (2013.01); *C03C 2217/281* (2013.01); *C03C 2218/156* (2013.01); *E06B 2009/2417* (2013.01); *Y02A 30/249* (2018.01); *Y02B 80/22* (2013.01)

(58) Field of Classification Search
CPC . Y02A 30/249; C03C 2218/156; C03C 17/23; C03C 17/3639; C03C 17/3626; C03C 17/3642; C03C 17/3644; C03C 17/3681; C03C 17/365; C03C 2217/212; C03C 2217/211; C03C 2217/23; C03C 2217/216; C03C 2217/213; C03C 2217/256; B60J 1/001
See application file for complete search history.

(56) References Cited

U.S. PATENT DOCUMENTS

| | | |
|---|---|---|
| 2004/0005467 A1 | 1/2004 | Neuman et al. |
| 2011/0169402 A1 | 7/2011 | Lingle et al. |
| 2012/0225224 A1 | 9/2012 | Blacker |
| 2014/0186598 A1 | 7/2014 | Ding et al. |
| 2015/0140354 A1 | 5/2015 | Pallotta et al. |
| 2015/0191965 A1 | 7/2015 | Ding |

FOREIGN PATENT DOCUMENTS

| | | |
|---|---|---|
| CN | 103073196 A | 5/2013 |
| CN | 103241961 A | 8/2013 |
| CN | 105015109 A | 11/2015 |
| RU | 2581917 C2 | 4/2016 |
| WO | WO 2015-183681 | 12/2015 |

* cited by examiner

IG WINDOW UNIT HAVING TRIPLE SILVER COATING AND DIELECTRIC COATING ON OPPOSITE SIDES OF GLASS SUBSTRATE

This application is a continuation of application Ser. No. 15/917,909, filed Mar. 12, 2018, which is based on Provisional Application Ser. No. 62/469,556, filed Mar. 10, 2017, the entire disclosures of which are hereby incorporated herein by reference in its entireties.

This invention relates to an insulating glass (IG) window unit including first and second glass substrates that are spaced apart from each other. At least one of the glass substrate has a triple silver low-emissivity (low-E) coating on one major side thereof, and a dielectric coating for improving angular stability on the other major side thereof.

BACKGROUND AND SUMMARY OF THE INVENTION

Low solar factor (SF) and solar heat gain coefficient (SHGC) values are desired in some applications, particularly in warm weather climates. Solar factor (SF), calculated in accordance with EN standard 410, relates to a ratio between the total energy entering a room or the like through a glazing and the incident solar energy. Thus, it will be appreciated that lower SF values are indicative of good solar protection against undesirable heating of rooms or the like protected by windows/glazings. A low SF value is indicative of a coated article (e.g., IG window unit) that is capable of keeping a room fairly cool in summertime months during hot ambient conditions. Thus, low SF values are sometimes desirable in hot environments. High light-to-solar gain (LSG) values are also desirable. LSG is calculated as $T_{vis}$/SHGC. The higher the LSG value, the more visible light that is transmitted and the less amount of heat that is transmitted by the coated article. While low SF and SHGC values, and high LSG values, are sometimes desirable for coated articles such as IG window units and/or monolithic windows, the achievement of such values may come at the expense of sacrificing coloration and/or reflectivity values. In particular, conventional attempts to achieve low SHGC values have often resulted in undesirably low LSG values and/or undesirable visible coloration of the coating. It is often desirable, but difficult, to achieve a combination of acceptable visible transmission (TY or $T_{vis}$), desirable glass side reflective coloration (e.g., desirable a* and b* glass side reflective color values), low SHGC, desirably low film side visible reflectance, and high LSG for a coated article in window applications, especially if it desired to use a glass substrate that is not deeply tinted.

SF (G-Factor; EN410-673 2011) and SHGC (NFRC-2001) values are calculated from the full spectrum ($T_{vis}$, Rg and Rf) and are typically measured with a spectrophotometer such as a Perkin Elmer 1050. The SF measurements are done on monolithic coated glass, and the calculated values can be applied to monolithic, IG and laminated applications.

It would be desirable according to example embodiments of this invention for a coating to be designed so as to have a combination of acceptable visible transmission (TY or $T_{vis}$), low emittance/emissivity, low SHGC, and high LSG for a coated article in window applications.

In certain embodiments of this invention there is provided an insulating glass (IG) widow unit comprising: first and second glass substrates; wherein the first glass substrates supports a low-E coating and a dielectric coating on opposite major surfaces thereof; wherein the low-E coating comprises first, second, and third infrared (IR) reflecting layers comprising silver separated by at least dielectric layers; wherein the dielectric coating comprises a plurality of alternating high index and low index layers that contact each other; and wherein the low-E coating and the dielectric coating are configured so that the IG window unit has an LSG value of at least 2.0, and a $\Delta C$ value of no greater than 3.0 as viewed from an exterior of a building in which the IG window unit is to be mounted across a range of angles of at least 85 degrees.

DETAILED DESCRIPTION OF EXAMPLES OF THE INVENTION

Figure 1:
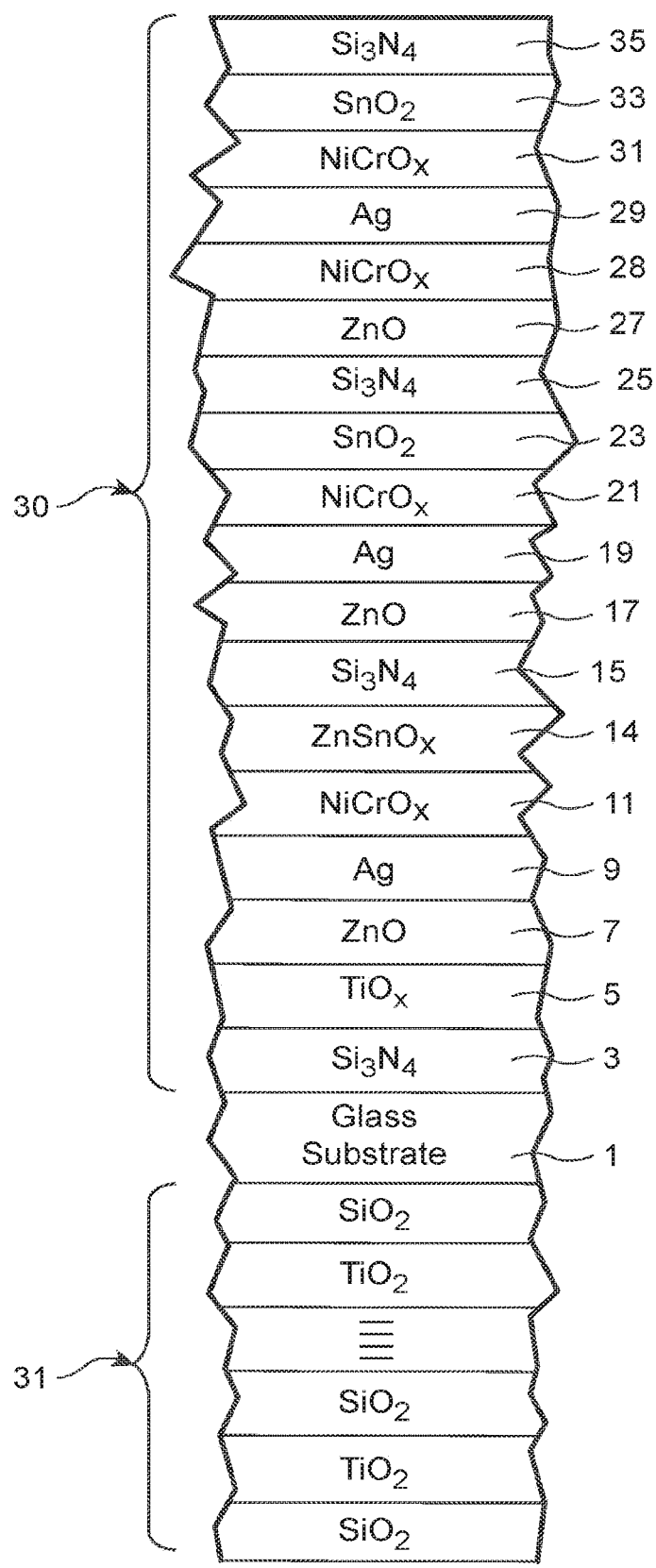
FIG. 1 is a cross sectional view of a coated article according to an example embodiment of this invention.

Referring now more particularly to the accompanying drawings in which like reference numerals indicate like parts throughout the several views/embodiments.

Low-emissivity coating glass is widely used in commercial and residential buildings, including in IG window units. Window color is important for people in selection of windows, and window color variation from a large building could be an intolerance issue for architectures. The color of a window coating from the first story to the top story of a tall building can be varied due to the reflection at different angles. Thus, herein we resolve the angular color variation issue for window glass coating, by reducing variation in color across a large range of viewing angles.

This angular color issue is a trade off with respect to LSG value for triple silver low-E coatings. In particular, in general the higher the LSG value, the worse the angular color issues. Thus, heretofore it has not been possible to combine a high LSG value with a reduced variation in color across a wide range of viewing angles.

The parameter $\Delta C$ may be used for quantitatively calculating variation of color across viewing angle, $$\Delta C = \sqrt{(a-a_o)^2+(b-b_o)^2}$$

Note that a, b and $a_o$, $b_o$ are two color values (a*, b* color values, which may be transmissive, glass side/exterior reflective, or film side/interior reflective) at different viewing angles. For instance, a maxim $\Delta C$ cross 0-90 degrees for example may be used for a measure of how much color varied cross this angle range. The low-E coating is widely used in the window coating, and the angular color is an issue to nearly most of triple silver with high LSG at the high buildings. Example triple silver low-E coatings are shown in FIG. 1, and in the provisional application upon which this application is based. In an IG window unit, an optimized angular color $\Delta C$ is typically very large as explained herein, typically increasing as LSG increases.

Normally, human eyes can distinguish ΔC>>3 easily. However, if ΔC<2 then it is hard to human eyes to easily tell the difference. Thus, it is desirable herein to combine a triple silver in a window so as to have both a high LSG value (e.g., at least 2.0, more preferably at least 2.2, and most preferably at least 2.3) and a ΔC value of no greater than 4.0, more preferably no greater than 3.0, more preferably no greater than 2.5, and most preferably no greater than 2.0, and most preferably no greater than 1.5, especially in connection with glass side/exterior reflective color values a* and b*, across a wide range of angles such as 60 degrees, or even 85 or 90 degrees.

In example embodiments of this invention, we found a solution and way to achieve the desirable features by providing a second glass side coating in an IG window unit. An insulating glass (IG) window unit includes first and second glass substrates that are spaced apart from each other. At least one of the glass substrates 1 has a triple silver low-emissivity (low-E) coating 30 on one major side thereof, and a dielectric coating 31 for improving angular stability on the other major side thereof.

Figure 3:
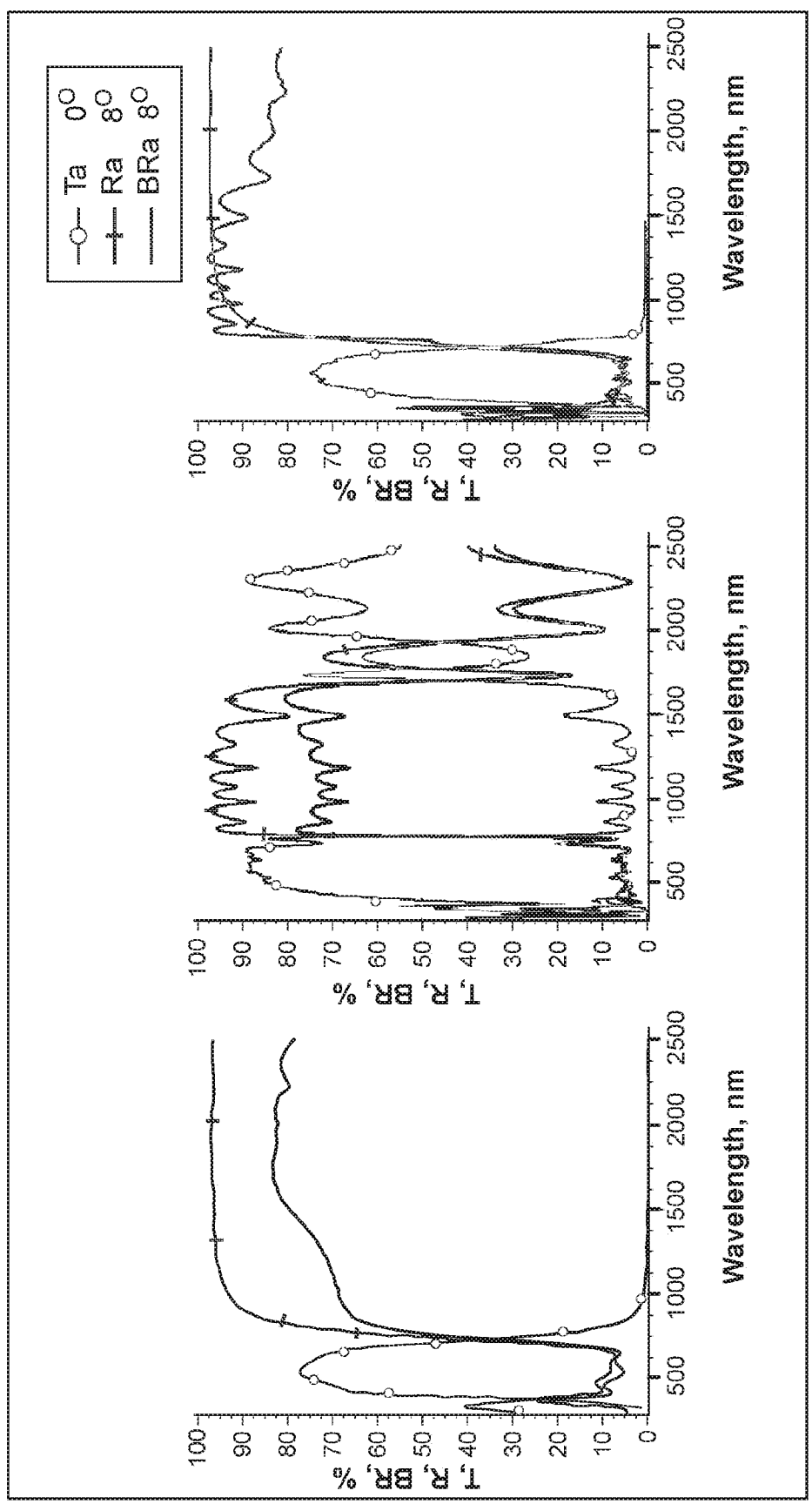
FIG. 3 illustrates graphs according to example embodiments of this invention plotting wavelength (nm) versus optical features including transmission (T) and Reflection (R).
Figure 4:
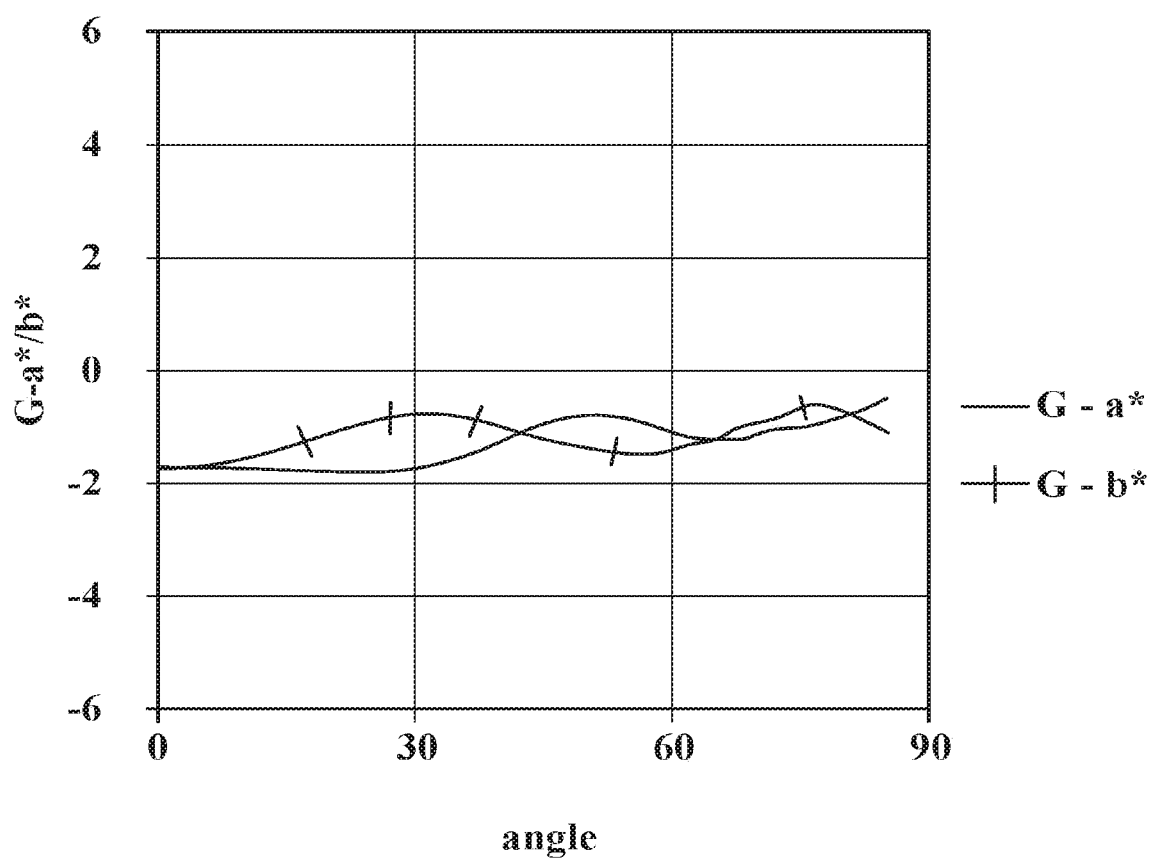
FIG. 4 is an angle versus glass side reflective a*, b* color value graph illustrating very low variation in glass side reflective a* and b* color values across a wide range of angles according to an example embodiment of this invention.

The left side graph in FIG. 3 is a plot for a typical triple silver coating 30, without any additional dielectric coating 31 (bad angular color variation ΔC~14). The middle graph in FIG. 3 is a plot for the additional dielectric coating 31 alone on the glass substrate with high visible transmission but very low near IR transmission (800~1700 nm). And the right-hand graph in FIG. 3 is a plot for the combination of triple silver low-E coating 30 and additional dielectric coating 31 on opposite sides of the glass substrate. When combining the two coatings 30 and 31 on opposite sides of the glass substrate 1, it was surprisingly found that ΔC dropped significantly down to less than 1.5, as evidenced by FIG. 4 which illustrates the very low variation in glass side reflective a* and b* color values across a wide range of angles when both coatings 30 and 31 were present.

In example embodiments of this invention, dielectric angular reduction coating 31 may be made up of alternating high index (e.g., $TiO_2$ or Nb oxide) and low index (e.g., $SiO_2$) layers, with example being fifty-two such layers in alternating fashion to make up coating 31 in order to achieve high transparency in the visible spectra (400 nm~700 nm), and low transparency in the near IR spectra (800 nm~1700 nm), so as to control the solar energy to achieve high LSG values (e.g., 2.34 with this coating in the FIG. 1-4 embodiment). The high index layers of coating 31 may have a refractive index (n, at 550 nm) of from about 2.2 to 2.5, and the low index layers of coating 31 may have a refractive index of from about 1.2 to 1.6, more preferably from about 1.45 to 1.58, in certain example embodiments of this invention. Dielectric angular reduction coating 31 may be made by various methods, such as thermal evaporation, magnetron sputtering, e-beam sputtering, sol-gel, multilayer polymer, or the like.

Thus, in example embodiments of this invention, we developed a new technique that solves the triple silver angular color issue via the use of special dielectric angular reduction coating 31 on the other side of the glass substrate 1 from the triple silver low-E coating 30, so as to provide a low ΔC such as no greater than 1.5, across a wide range of angles such as 60 degrees, or even 85 or 90 degrees.

Example embodiments of this invention relate to a coated article including a low emissivity (low-E) coating 30 and dielectric angular reduction coating 31 supported on opposite major sides of a glass substrate 1. Coating 30 may be sputter-deposited. The coated article may be heat treated (e.g., thermally tempered, heat bent and/or heat strengthened).

FIG. 1 is a side cross sectional view of a coated article according to an example non-limiting embodiment of this invention, where the low-E coating 30 has three silver-based IR reflecting layers 9, 19 and 29. The coated article includes substrate 1 (e.g., clear, green, bronze, or blue-green glass substrate from about 1.0 to 10.0 mm thick, more preferably from about 1.0 mm to 8.0 mm thick, e.g., about 6 mm thick), and coating (or layer system) 30 provided on the substrate 1 either directly or indirectly. The coating (or layer system) 30 includes: bottom silicon nitride inclusive transparent dielectric layer 3 which may be $Si_3N_4$, of the Si-rich type for haze reduction, or of any other suitable stoichiometry in different embodiments of this invention, optional dielectric layer 5 of a material such as an oxide of titanium, first lower contact layer 7 (which contacts IR reflecting layer 9), first conductive and preferably metallic or substantially metallic infrared (IR) reflecting layer 9, first upper contact layer 11 (which contacts layer 9), transparent dielectric layer 14 of or including zinc stannate over and contacting the contact layer 11, optional transparent dielectric silicon nitride inclusive layer 15, second lower contact layer 17 (which contacts IR reflecting layer 19), second conductive and preferably metallic or substantially metallic IR reflecting layer 19, second upper contact layer 21 (which contacts layer 19), transparent dielectric layer 23, and optional transparent silicon nitride inclusive dielectric layer 25. The coating 30 further includes transparent dielectric lower contact layer 27 of or including zinc oxide, optional transparent third lower contact layer 28 of or including NiCr, NiCrOx or the like, third conductive and preferably metallic or substantially metallic IR reflecting layer 29, third upper contact layer 31 (which contacts layer 29), transparent dielectric layer 33, and transparent silicon nitride inclusive dielectric layer 35. It is also possible to replace tin oxide layer 33 or any other tin oxide layer (e.g., 23) with a zinc stannate layer similar to layer 14 so that the zinc stannate layer would be over and directly contacting contact layer 31 for instance. It is also possible to replace the layer 5 with a layer of or including zinc stannate or the like.

Figure 2:
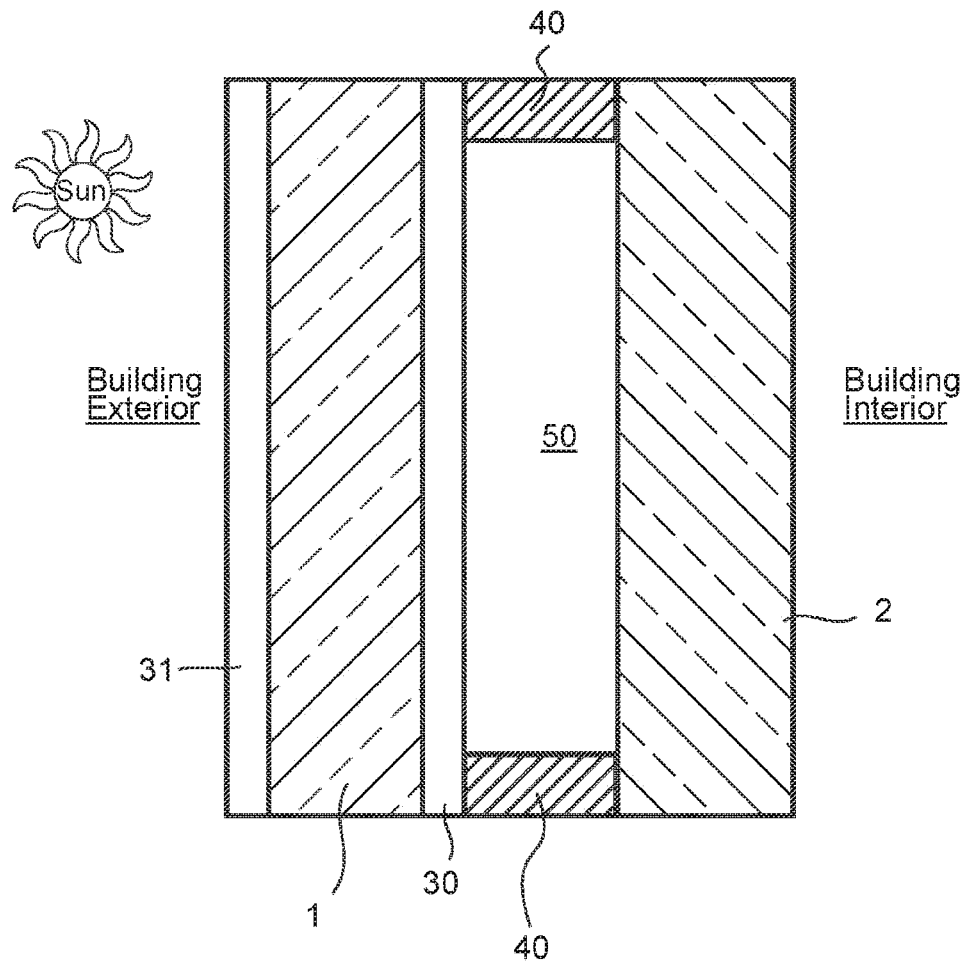
FIG. 2 is a cross sectional view showing the coated article of FIG. 1 provided in an IG window unit according to example embodiments of this invention (on surface two of an IG window unit).

In monolithic instances, the coated article includes only one glass substrate 1 as illustrated in FIG. 1. However, monolithic coated articles herein may be used in devices such as laminated vehicle windshields, IG window units, and the like. As for IG window units, an IG window unit may include at least two spaced apart glass substrates. An example IG window unit is illustrated and described, for example, in U.S. Patent Document No. 2004/0005467, the disclosure of which is hereby incorporated herein by reference. FIG. 2 shows an example IG window unit including the coated glass substrate 1 shown in FIG. 1 coupled to another glass substrate 2 via spacer(s), sealant(s) 40 or the like, with a gap 50 being defined therebetween. This gap 50 between the substrates in IG window unit embodiments may in certain instances be filled with a gas such as argon (Ar), or a mixture of Ar gas and air. An example IG unit may comprise a pair of spaced apart clear glass substrates 1 and 2 each about 3-8 mm thick (e.g., about 6 mm thick), one of which is coated with a coating 30 herein in certain example instances, where the gap 50 between the substrates may be from about 5 to 30 mm, more preferably from about 10 to 20 mm, and most preferably about 16 mm. In certain example instances, the low-E coating 30 may be provided on the interior surface of either substrate facing the gap. Either substrate 1 or substrate 2 may be the outermost substrate of the IG window unit at the building exterior (e.g., in FIG. 2 the substrate 1 is the substrate closest to the building exterior, and the low-E coating 30 is provided on surface #2 of the IG window unit). In preferred embodiments of this invention, the coating 30 is provided on surface #2 of the IG window unit, and coating 31 may be provided on surface #1, as shown in FIG. 2.

Dielectric layers 3, 15, 25 and/or 35 may be of or include silicon nitride in certain embodiments of this invention. The silicon nitride of these layers may be of the stoichiometric type (i.e., $Si_3N_4$), or alternatively of the Si-rich type in different embodiments of this invention.

Infrared (IR) reflecting layers 9, 19 and 29 are preferably substantially or entirely metallic and/or conductive, and may comprise or consist essentially of silver (Ag), gold, or any other suitable IR reflecting material. IR reflecting layers 9, 19 and 29 help allow the coating to have low-E and/or good solar control characteristics. The IR reflecting layers may, however, be slightly oxidized in certain embodiments of this invention.

The upper contact layers 11, 21 and 31 (and possibly lower contact layer 28) may be of or include nickel (Ni) oxide, chromium/chrome (Cr) oxide, or a nickel alloy oxide such as nickel chrome oxide ($NiCrO_x$), $NiCrMoO_x$, or other suitable material(s) such as Ti or an oxide of Ti, in certain example embodiments of this invention.

Transparent dielectric layers 23 and 33 may be of or include tin oxide in certain example embodiments of this invention. However, it may be doped with certain other materials in other example embodiments, such as with Al or Zn in certain example alternative embodiments.

Lower contact or seed layers 7, 17 and/or 27), in certain embodiments of this invention are of or include zinc oxide (e.g., ZnO). The zinc oxide of these layers may contain other materials as well such as Al (e.g., to form $ZnAlO_x$). For example, in certain example embodiments of this invention, one or more of zinc oxide layers may be doped with from about 1 to 10% Al, more preferably from about 1 to 5% Al, and most preferably about 1 to 4% Al.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers of coating 30 on the glass substrate 1 in the FIG. 1 embodiment are as follows, from the glass substrate outwardly:

Example Materials/Thicknesses

| Layer Glass (1-10 mm thick) | Preferred Range (Å) | More Preferred (Å) | Example (Å) |
|---|---|---|---|
| $Si_xN_y$ (layer 3) | 40-600 Å | 100-300 Å | 136 Å |
| $TiO_x$ (layer 5) | 7-150 Å | 7-50 Å | 10 Å |

Example Materials/Thicknesses -continued

| Layer Glass (1-10 mm thick) | Preferred Range (Å) | More Preferred (Å) | Example (Å) |
|---|---|---|---|
| $ZnAlO_x$ (layer 7) | 10-300 Å | 60-140 Å | 90 Å |
| Ag (layer 9) | 50-250 Å | 80-120 Å | 109 Å |
| $NiCrO_x$ (layer 11) | 10-100 Å | 20-40 Å | 30 Å |
| ZnSnO (layer 14) | 200-800 Å | 350-600 Å | 435 Å |
| $Si_xN_y$ (layer 15) | 50-350 Å | 80-200 Å | 130 Å |
| $ZnAlO_x$ (layer 17) | 80-300 Å | 170-250 Å | 220 Å |
| Ag (layer 19) | 60-160 Å | 90-130 Å | 110 Å |
| $NiCrO_x$ (layer 21) | 10-100 Å | 20-40 Å | 30 Å |
| $SnO_2$ (layer 23) | 50-750 Å | 150-300 Å | 220 Å |
| $Si_3N_4$ (layer 25) | 10-750 Å | 100-170 Å | 130 Å |
| $ZnAlO_x$ (layer 27) | 50-300 Å | 190-260 Å | 238 Å |
| $NiCrO_x$ (layer 28) | 7-40 Å | 7-20 Å | 10 Å |
| Ag (layer 29) | 50-250 Å | 120-135 Å | 120 Å |
| $NiCrO_x$ (layer 31) | 10-100 Å | 20-40 Å | 30 Å |
| $SnO_2$ (layer 33) | 0-750 Å | 50-120 Å | 75 Å |
| $Si_3N_4$ (layer 35) | 10-750 Å | 100-250 Å | 201 Å |

In certain example embodiments of this invention, coated articles according to the FIG. 1 embodiment may have the following optical and solar characteristics when measured monolithically before and/or after optional HT. The sheet resistances ($R_s$) herein take into account all IR reflecting layers (e.g., silver layers 9, 19, 29).

Optical/Solar Characteristics

| Characteristic | General | More Preferred | Most Preferred |
|---|---|---|---|
| $R_s$ (ohms/sq.): | <=3.0 | <=2.5 | <=2.0 or <=1.6 or <=1.4 |
| $E_n$: | <=0.07 | <=0.04 | <=0.03 |
| $T_{vis}$ (Ill. C 2°): | >=40% | >=50% | >=60% |

In certain embodiments of this invention there is provided an insulating glass (IG) widow unit comprising: first and second glass substrates; wherein the first glass substrates supports a low-E coating and a dielectric coating on opposite major surfaces thereof; wherein the low-E coating comprises first, second, and third infrared (IR) reflecting layers comprising silver separated by at least dielectric layers; wherein the dielectric coating comprises a plurality of alternating high index and low index layers that contact each other; and wherein the low-E coating and the dielectric coating are configured so that the IG window unit has an LSG value of at least 2.0, and a ΔC value of no greater than 3.0 as viewed from an exterior of a building in which the IG window unit is to be mounted across a range of angles of at least 85 degrees.

In the IG window unit of the immediately preceding paragraph, wherein the low-E coating and the dielectric coating may be configured so that the IG window unit has an LSG value of at least 2.2, and/or a ΔC value of no greater than 2.5 as viewed from an exterior of a building in which the IG window unit is to be mounted across a range of angles of at least 85 degrees.

In the IG window unit of any of the preceding two paragraphs, the low-E coating and the dielectric coating may be configured so that the IG window unit has an LSG value of at least 2.3, and/or a ΔC value of no greater than 2.0 as viewed from an exterior of a building in which the IG window unit is to be mounted across a range of angles of at least 85 degrees.

In the IG window unit of any of the preceding three paragraphs, the low-E coating and the dielectric coating may be configured so that the IG window unit has an LSG value of at least 2.3, and/or a ΔC value of no greater than 1.5 as viewed from an exterior of a building in which the IG window unit is to be mounted across a range of angles of at least 85 degrees.

In the IG window unit of any of the preceding four paragraphs, the low-E coating may have a sheet resistance ($R_s$) of no greater than 2.0 ohms/square.

In the IG window unit of any of the preceding five paragraphs, the high index layers may comprise an oxide of titanium or niobium.

In the IG window unit of any of the preceding six paragraphs, the low index layers may comprise an oxide of silicon.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An insulating glass (IG) widow unit comprising:
   first and second glass substrates;
   wherein the first glass substrate supports a low-E coating and an angular reduction dielectric coating on respective opposite major surfaces thereof, respectively;
   wherein the low-E coating comprises first, second, and third infrared (IR) reflecting layers comprising silver, wherein at least a first dielectric layer of the low-E coating is provided between at least the first and second IR reflecting layers comprising silver, and at least a second dielectric layer of the low-E coating is provided between at least the second and third IR reflecting layers comprising silver;
   wherein the angular reduction dielectric coating, which is on a side of the first glass substrate opposite the low-E coating, comprises a plurality of high index and low index layers; and
   wherein the low-E coating and the angular reduction dielectric coating are configured so that the IG window unit has a ΔC value of no greater than 3.0 as viewed from an exterior of a building in which the IG window unit is to be mounted across a range of angles of at least 85 degrees from a normal viewing angle which is perpendicular to the IG window unit, and
   wherein ΔC is defined as $$\Delta C = [(a - a_o)^2 + [(b - b_o)^2]^{1/2}$$

where "a" is an a* color value at the normal viewing angle, and "$a_o$" is an a* color viewing angle at the off-axis viewing angle, "b" is a b* color value at the normal viewing angle, and "$b_o$" is a b* color viewing angle at the off-axis viewing angle.

2. The IG window unit of claim 1, wherein the low-E coating and the dielectric coating are configured so that the IG window unit has an LSG value of at least 2.2, and a ΔC value of no greater than 2 5 as viewed from an exterior of a building in which the IG window unit is to be mounted across a range of angles of at least 85 degrees.

3. The IG window unit of claim 1, wherein the low-E coating and the dielectric coating are configured so that the IG window unit has an LSG value of at least 2.3, and a ΔC value of no greater than 2 0 as viewed from an exterior of a building in which the IG window unit is to be mounted across a range of angles of at least 85 degrees.

4. The IG window unit of claim 1, wherein the low-E coating and the dielectric coating are configured so that the IG window unit has an LSG value of at least 2.3, and a ΔC value of no greater than 1 5 as viewed from an exterior of a building in which the IG window unit is to be mounted across a range of angles of at least 85 degrees.

5. The IG window unit of claim 1, wherein the low-E coating has a sheet resistance ($R_s$) of no greater than 2.0 ohms/square.

6. The IG window unit of claim 1, wherein the high index layers comprise an oxide of titanium.

7. The IG window unit of claim 1, wherein the high index layers comprise an oxide of niobium.

8. The IG window unit of claim 1, wherein the low index layers comprise an oxide of silicon.

9. An insulating glass (IG) widow unit comprising:
   first and second substrates;
   wherein the first substrate supports a low-E coating and an angular reduction dielectric coating on respective opposite major surfaces thereof, respectively;
   wherein the low-E coating comprises first, second, and third infrared (IR) reflecting layers, wherein at least a first dielectric layer of the low-E coating is provided between at least the first and second IR reflecting layers, and at least a second dielectric layer of the low-E coating is provided between at least the second and third IR reflecting layers;
   wherein the angular reduction dielectric coating, which is on a side of the first glass substrate opposite the low-E coating, comprises at least one high index layer and at least one low index layer; and
   wherein the low-E coating and the angular reduction dielectric coating are configured so that the IG window unit has a ΔC value of no greater than 3.0 as viewed from an exterior of a building in which the IG window unit is to be mounted across a range of angles of at least 85 degrees from a normal viewing angle which is perpendicular to the IG window unit, and
   wherein ΔC is defined as $$\Delta C = [(a - a_o)^2 + [(b - b_o)^2]^{1/2}$$

where "a" is an a* color value at the normal viewing angle, and "$a_o$" is an a* color viewing angle at the off-axis viewing angle, "b" is a b* color value at the normal viewing angle, and "$b_o$" is a b* color viewing angle at the off-axis viewing angle.

* * * * *